United States Patent
Patil

(10) Patent No.: US 6,223,103 B1
(45) Date of Patent: *Apr. 24, 2001

(54) DRIVER DISPLAY WITH HIGHLIGHTED IMAGES

(75) Inventor: Ravi Patil, Canton, MI (US)

(73) Assignee: Lear Automotive Dearborn, Inc., Dearborn, MI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/968,389

(22) Filed: Nov. 12, 1997

(51) Int. Cl.$^7$ .............................. G06F 17/00; G06F 7/00
(52) U.S. Cl. ..................... 701/1; 701/28; 340/438; 345/90
(58) Field of Search ................. 701/1, 28; 340/438, 340/439, 980; 345/4, 7, 11, 77, 90, 127, 173; 359/630

(56) References Cited

U.S. PATENT DOCUMENTS

| 5,424,754 | * | 6/1995 | Bar et al. ............................ 345/150 |
| 5,638,060 | | 6/1997 | Kataoka et al. ....................... 341/20 |
| 5,757,268 | * | 5/1998 | Toffolo et al. ....................... 340/461 |
| 5,784,036 | * | 7/1998 | Higuchi et al. ........................... 345/7 |
| 5,821,935 | * | 10/1998 | Hartman et al. ....................... 701/36 |
| 5,847,704 | * | 12/1998 | Hartman ............................... 345/339 |
| 5,857,159 | * | 1/1999 | Dickrell et al. ....................... 701/35 |

FOREIGN PATENT DOCUMENTS

| 3146152A1 | 1/1983 | (DE) . |
| 2636396A1 | 9/1988 | (FR) . |
| 2738196A1 | 8/1995 | (FR) . |

* cited by examiner

Primary Examiner—William A. Cuchlinski, Jr.
Assistant Examiner—Gertrude Arthur
(74) Attorney, Agent, or Firm—Niro, Scavone, Haller & Niro

(57) ABSTRACT

A vehicle display system includes an electroluminescent display showing images of a plurality of control switches within the vehicle. Whenever one of the control switches is accessed by a vehicle operator, a controller alters the image of that control switch. The altered image can be highlighted or have a different color, for example. The visual indication of which switch is being accessed provides the vehicle operator visual confirmation of which switch is being accessed so that the operator need not look directly at the switch.

15 Claims, 1 Drawing Sheet

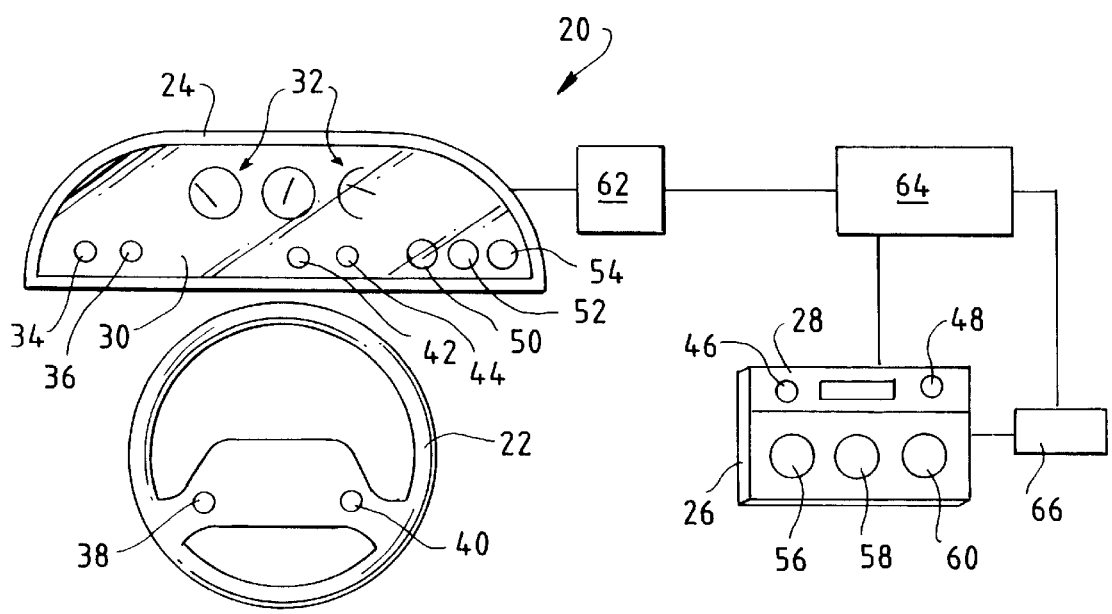

DRIVER DISPLAY WITH HIGHLIGHTED IMAGES

BACKGROUND OF THE INVENTION

This invention generally relates to displays for drivers of vehicles that provide a visual indication of the status or condition of the vehicle and subsystems associated with the vehicle.

Contemporary vehicles include a wide range of features to make the driving experience more enjoyable and luxurious. Each of these features typically requires a separate control switch that is actuated by a driver or passenger to achieve a desired result. Examples include the heating, ventilation and air conditioning system and the car stereo system. One problem introduced by including more and more features in a vehicle is the distraction of the driver's attention from the task of driving while the driver is adjusting the various controls. A variety of attempts at alleviating this situation have been proposed or implemented. For example, it has been suggested to include one or more of the control switches on the steering wheel of the vehicle. This is not without drawbacks, however, because there is limited space available on the steering wheel and the wiring for such an arrangement can be complicated and overly expensive. Further, placing a large number of switches within a confined area requires relatively small switches. Smaller switches tend to require more driver attention to ensure that the desired switch is being adjusted.

It would be desirable to provide a system that allows a driver to adjust a variety of switches within a vehicle while minimizing the distraction of the driver's attention from the road. This invention provides such a system through a visual display that indicates which switch is being adjusted while minimizing the diversion of the driver's attention from watching the road.

SUMMARY OF THE INVENTION

In general terms, this invention is a driver display that highlights an image of a control switch that is being adjusted by a driver. Several basic elements are required for this invention including the display upon which the images of the various control switches are shown. A controller controls the images to be displayed. The control switches that are used to adjust the various subsystems within the vehicle are connected with a sensor arrangement that determines which of the switches is being manipulated by the driver. The sensor arrangement communicates with the display controller and the display controller highlights the image of the switch that is being manipulated so that the driver can confirm whether the desired switch has been accessed by simply glancing at the display without having to look directly at the switch itself.

The various features and advantages of this invention will become apparent to those skilled in the art from the following detailed description of the currently preferred embodiment. The drawing that accompanies the detailed description can be briefly described as follows.

BRIEF DESCRIPTION OF THE DRAWING

The FIGURE diagrammatically and schematically illustrates a vehicle display system designed according to this invention.

DETAILED DESCRIPTION OF THE PREFERRED EMBODIMENT

The FIGURE illustrates selected portions 20 of an interior of a vehicle including a steering wheel 22 and a driver display 24 that is positioned directly in front of the driver. The display 24 preferably is located where an instrument panel is positioned in most vehicles. A heating, ventilation and air conditioning control console 26 is supported in the interior of the vehicle in a conventional manner. A stereo 28 also is provided.

The driver display 24 preferably includes an electroluminescent display screen 30 for displaying a variety of images that are useful or necessary to the driver of the vehicle. For example, images 32 provide information to the driver regarding the speed of the vehicle, the RPM's of the engine and the level of fuel within the fuel tank. In the preferred embodiment, the display screen 30 also displays images of the various control switches associated with various vehicle subsystems.

Images 34 and 36 correspond to the control switches 38 and 40, which are useful for adjusting the vehicle cruise control system. Images 42 and 44 correspond to the control switches 46 and 48 for adjusting the function of the vehicle radio 28. Similarly, images 50, 52 and 54 correspond to the control switches 56, 58 and 60, respectively, which are useful for adjusting the temperature within the vehicle interior.

A controller 62 controls the images and the information displayed on the display screen 30. A second controller 64 operates the various vehicle subsystems depending upon the adjustments made to the control switches. Although two controllers 62 and 64 are schematically illustrated, those skilled in the art will appreciate that the control functions described in this specification can be accomplished through a single controller or through a plurality of controllers.

Importantly, a sensor arrangement 66 is associated with the control switches within the vehicle. The sensor arrangement 66 can take many forms. The preferred embodiments include using temperature sensitive or pressure sensitive devices that are coupled with each of the control switches. Whenever the driver or a passenger in the vehicle touches one of the control switches, the sensor arrangement 66 detects the presence of the individual's fingers. The pressure applied by the fingers or the body temperature is detected through the sensor arrangement 66.

The sensor communicates to the controller 64 which of the control switches has been accessed. The controller 64 communicates this information to the controller 62. The image on the display screen 30 corresponding to the control switch that has been accessed is then altered compared to the other images to provide a visual indication of which switch has been accessed. The controller 62 can alter the image by making that image brighter, darker or changing colors, for example. Visually indicating which switch has been accessed allows the driver to confirm that the desired adjustment will be made without having to look directly at the control switch. The driver need only have a general idea of the location of the desired switch and need not divert much attention to looking at the switches. Simply glancing at the driver display 24 to confirm that the appropriate switch has been accessed enhances the driver's ability to stay focused on the road.

Given this specification, those skilled in the art will be able to realize the appropriate controller by choosing from among commercially available devices or designing a microprocessor or dedicated circuitry to accomplish the functions described above. Similarly, given this description, those skilled in the art will be able to develop software as necessary to accomplish the results described above.

The preceding description is exemplary rather than limiting in nature. Variations and modifications may become apparent to those skilled in the art that do not necessarily depart from the purview and spirit of this invention. The legal scope of protection given to this invention can only be determined from the following claims.

The following is claimed:

1. A vehicle display system, comprising:

a display;

a controller for controlling images to be displayed on said display, said images including information regarding a speed of the vehicle and a fuel level within a fuel tank associated with the vehicle;

a plurality of control switches for adjusting a respective plurality of vehicle subsystems, said controller controlling said display to display images of said control switches simultaneously with said images of speed and fuel level information; and a sensor arrangement associated with said control switches for determining which of said switches has been accessed by a vehicle operator, wherein said sensor communicates with said display controller so that the image on said display of the accessed control switch is altered to provide a visual indication of said control switch access while maintaining the remaining images of said control switches in place and without substantial change.

2. The system of claim 1, wherein said sensor includes a device that detects the presence of one or more fingers of the vehicle operator in contact with one or more of said control switches.

3. The system of claim 2, wherein said sensor is temperature-sensitive.

4. The system of claim 2, wherein said sensor is pressure-sensitive.

5. The system of claim 1, wherein said display is an electroluminescent display.

6. The system of claim 1, wherein said controller is a microprocessor.

7. The system of claim 6, wherein said microprocessor alters said image by changing the brightness of said image on said display.

8. The system of claim 6, wherein said microprocessor alters said image by changing the color of said image on said display.

9. A method of providing a visual indication of contact with a control switch within a vehicle, comprising the steps of:

(A) generating a display including a first plurality of images corresponding to information regarding a speed of the vehicle and a fuel level within a fuel tank associated with the vehicle and a second plurality of images corresponding to a plurality of control switches, said first plurality of images and said second plurality of images being displayed simultaneously on a single display;

(B) determining which of the control switches is accessed by a vehicle operator; and (C) altering the image of the accessed control switch that has been accessed by the vehicle operator while maintaining the remaining images of said second plurality of images in place and without substantial change.

10. The method of claim 9, wherein step (C) is performed by highlighting the image of the accessed control switch.

11. The method of claim 9, wherein step (C) is performed by changing the brightness of the image of the accessed control switch.

12. The method of claim 9, wherein step (C) is performed by changing the color of the image of the accessed control switch.

13. The method of claim 9, wherein step (B) is performed by detecting the presence of a vehicle operator's finger on the control switch.

14. The method of claim 13, wherein step (B) is performed by detecting a temperature difference caused by the presence of the operator's finger.

15. The method of claim 13, wherein step (B) is performed by detecting pressure exerted upon the control switch by the operator's finger.

* * * * *